(12) United States Patent
Teicher et al.

(10) Patent No.: US 6,205,396 B1
(45) Date of Patent: Mar. 20, 2001

(54) GUIDANCE SYSTEM USING CHANGEABLE SIGNS

(75) Inventors: Mordechai Teicher, Kfar Saba; Avner Halperin, Tel Aviv, both of (IL)

(73) Assignee: Eldat Communications Ltd., Bnei Brak (IL)

( * ) Notice: Subject to any disclaimer, the term of this patent is extended or adjusted under 35 U.S.C. 154(b) by 0 days.

(21) Appl. No.: 09/147,422

(22) PCT Filed: Jun. 15, 1997

(86) PCT No.: PCT/IL97/00192

§ 371 Date: Dec. 21, 1998

§ 102(e) Date: Dec. 21, 1998

(87) PCT Pub. No.: WO98/00819

PCT Pub. Date: Jan. 8, 1998

(30) Foreign Application Priority Data

Jun. 19, 1996 (IL) .................................................. 118686

(51) Int. Cl.[7] .................................................. G08G 1/123
(52) U.S. Cl. ...................... 701/200; 701/207; 342/357.07
(58) Field of Search .................................. 701/200, 207; 340/825.36, 825.49, 825.54; 342/357.01, 357.07, 357.1; 705/41

(56) References Cited

U.S. PATENT DOCUMENTS

| | | | |
|---|---|---|---|
| 3,662,267 | 5/1972 | Reed | 340/993 |
| 3,739,339 | 6/1973 | Hillhouse et al. | 340/825.35 |
| 3,908,800 | 9/1975 | Drapeau | 186/56 |
| 4,346,453 | 8/1982 | Drapeau et al. | 705/28 |
| 4,750,151 | 6/1988 | Baus | 700/90 |
| 4,757,455 | 7/1988 | Tsunoda et al. | 701/208 |
| 4,763,270 | 8/1988 | Itoh et al. | 701/209 |
| 4,814,742 * | 3/1989 | Morita et al. | 340/825.54 |
| 5,041,983 | 8/1991 | Nakahara et al. | 701/209 |
| 5,206,811 | 4/1993 | Itoh et al. | 701/211 |
| 5,387,993 | 2/1995 | Heller et al. | 359/155 |
| 5,430,441 * | 7/1995 | Bickley et al. | 340/825.54 |
| 5,504,475 * | 4/1996 | Houdou et al. | 340/825.35 |
| 5,565,858 * | 10/1996 | Guthrie | 340/825.35 |
| 5,640,002 * | 6/1997 | Ruppert et al. | 235/472 |
| 5,704,049 * | 12/1997 | Briechle | 345/326 |
| 5,726,630 * | 3/1998 | Marsh et al. | 340/572 |
| 5,734,839 * | 3/1998 | Enoki et al. | 705/20 |
| 5,798,693 * | 8/1998 | Engellenner | 340/505 |
| 6,032,127 * | 2/2000 | Schkolnick et al. | 705/23 |

OTHER PUBLICATIONS

Pick–to–Light Directs Productivity : however you store materials, PTL indicators make for timely and accurate orderpicking by Schwind, Gene F., Material Handling Engineering, Dec 1993, pp. 1–4.

* cited by examiner

*Primary Examiner*—Tan Nguyen
(74) *Attorney, Agent, or Firm*—Eitan, Pearl, Latzer & Cohen-Zedek

(57) ABSTRACT

A guidance system for guiding a user to selected targets located within a defined area, such as a warehouse, museum, parking garage, etc., includes a portable unit to be carried by each user and having a memory for storing target information identifying a selected target within the defined area, and a transmitter for transmitting signals identifying the selected target within the defined area. The system further includes at least one changeable guidance sign at a predetermined location within the defined area for receiving signals transmitted by a portable unit and for displaying stored guidance information of the location of a target corresponding to a signal transmitted from the portable unit, and/or a plurality of target devices at the target location for receiving target signals transmitting by a portable unit and for indicating that a received target signal identifies the respective target.

20 Claims, 9 Drawing Sheets

ASSIGNMENT MEMORY

| TARGET LOCATION | TARGET ID | ASSIGNMENT DETAILS | REPORT |
|---|---|---|---|
| 1. E6 | 1234 | PICK 4 BOXES | [_____] |
| 2. H3 | 4321 | PICK 2 UNITS | [_____] |
| 3. D1 | 3412 | PICK 2 UNITS & EXIT | [_____] |

FIG. 6A

GUIDANCE TABLE

| LOCATION | DIRECTION |
|---|---|
| A1 | LEFT |
| A2 | LEFT |
| ... | ... |

FIG. 6B

GUIDANCE SIGNAL

[TARGET LOCATION]
[TARGET ID]
[ASSIGNMENT DETAILS]
[OPERATOR ID]

FIG. 6C

ASSIGNMENT MEMORY

| ROUTE DIRECTIONS | TARGET ID | ASSIGNMENT DETAILS | REPORT |
|---|---|---|---|
| 1. 1-L;3-R;6-A;8-R; | 1234 | PICK 4 BOXES | [_____] |
| 2. 10-L;14-L;15-R; | 4321 | PICK 2 UNITS | [_____] |
| 3. 21-R;22-L; | 3412 | PICK 2 UNITS & EXIT | [_____] |

FIG. 7A

GUIDANCE TABLE

SIGN#=12

FIG. 7B

GUIDANCE SIGNAL

[OPERATOR ID]
["SIGN#-DIRECTION" OR
"TARGET ID-ASSIGNMENT"]

FIG. 7C

ASSIGNMENT MEMORY

| | TARGET ID | REPORT |
|---|---|---|
| 1. | 1234 | [_____] |
| 2. | 4321 | [_____] |
| 3. | 3412 | [_____] |

GUIDANCE TABLE

| TARGET ID | DIRECTION |
|---|---|
| 1234 | LEFT |
| 4321 | LEFT |
| ... | ... |

GUIDANCE SIGNAL

[TARGET ID]
[OPERATOR ID]

ASSIGNMENT TABLE

| | OPERATOR ID | ASSIGNMENT DETAILS |
|---|---|---|
| 1. | ABE | PICK 4 BOXES |
| 2. | HARRY | PICK 2 UNITS |
| 3. | JIM | PICK 2 UNITS & EXIT |

GUIDANCE SYSTEM USING CHANGEABLE SIGNS

FIELD AND BACKGROUND OF THE INVENTION

The present invention relates to guidance systems and in particular to such systems using changeable signs to lead a person to a predefined target.

Many human activities involve the need to reach a predefined location or object. Guidance means for choosing a preferred route or for identifying the target location or object are in common use, usually in the form of signs. Such signs, clearly visible from a fair distance, allow a person to choose the route to the target without interrupting the travel or risking travel safety. However, when the number of possible routes or targets is large, the use of common signs becomes impractical, because too much visual information must be displayed and then read and interpreted during travel. A changeable sign system capable of providing selectively guidance signals relating to a specific route or target of an individual, could be highly advantageous in such circumstances.

An example of an existing environment using changeable signs displaying route and target information is the so-called pick-to-light (PTL) system for warehouses. Such commercial systems and their advantages are described in the article "Pick-to-light directs productivity: however you store materials, PTL indicators make for timely and accurate orderpicking" by Schwind, Gene F., Material Handling Engineering, Dec. 1993, Page 43, downloaded through Compuserve Information Services. In such pick-to-light systems, the pick assignments are stored in a central computer. The central computer communicates with terminals positioned next to stock locations. When a certain pick assignment is activated by the central computer, lights in the corresponding terminals are turned on to provide the picker with clear visual guidance signals. Additional information may be generated by the central computer and displayed by the terminal, such as information relating to the pick quantity. The terminal may also include input means for keying-in and uploading pick reports. Other prior art references relating to pick-to-light systems include U.S. Pat. Nos. 3,739,339 to Hilihouse et al., 3,908,800 to Drapeau and 4,346,453 to Drapeau et al.

While having many advantages regarding productivity and accuracy, the existing pick-to-light systems have two major limitations: they can serve only a single picker or a small number of pickers operating simultaneously, and they require a costly communication infrastructure between the central computer and all terminals.

OBJECT AND BRIEF SUMMARY OF THE INVENTION

The following terms will be used herein as follows:
1. Assignment—a task to be performed including traveling toward and reaching a target location.
2. Operator—a human individual executing an assignment while traveling by foot or by a vehicle.
3. Guidance—the information provided to an operator for aiding in choosing a preferred route and/or in identifying the target location or item.
4. Sign—an object positioned next to traffic routes or target locations for displaying guidance information viewable by an operator from a fair distance and usable by operator without interrupting travel. Signs may incorporate lights and symbols for visibility and clarity.
5. Changeable sign—a sign which changes the information displayed thereon upon receiving an external signal.
6. Central computer—a computer storing assignment information.

The main object of the present invention is to provide a guidance system using changeable signs, which system can serve simultaneously a large number of operators and does not require a central computer, or a communication link between a central computer and the signs. Another object of the present invention into provide an assignment reporting system operable in conjunction with said guidance system.

According to one aspect of the present invention, there is provided a guidance system for guiding a user to selected targets among a plurality of targets located within a defined area, comprising:

a portable unit to be carried by the user, including a memory for storing target information identifying a selected target within said defined area, and a transmitter for signals identifying the selected target within said defined area;

and at least one changeable guidance sign at a predetermined location within said defined area, said changeable guidance sign including a receiver for receiving signals transmitted by said portable unit, a memory for storing guidance information relating the locations of said plurality of targets with respect to said predetermined location of the changeable guidance sign, a display for displaying the stored guidance information of the location of a target corresponding to as signal transmitted from said portable unit and received by the changeable guidance sign.

According to another aspect of the present invention, there is provided a guiding system for guiding a user to selected targets among a plurality of targets located within a defined area, comprising:

a portable unit to be carried by the user, including a memory for storing target information identifying a selected target within said defined area, and a transmitter for transmitting signals identifying the selected target within said defined area;

a plurality of target devices, one at each of said target locations, each of said target devices including a receiver for receiving target signals transmitted by said portable unit, and a target indicator for indicating that a received target signal identifies the respective target;

and a computer for storing said target data identifying the targets within said defined area, and for communicating with said portable unit to download into their respective memories the target information identifying selected targets within said defined area.

A number of applications of the invention are described for purposes of example, including a warehouse for storing a large number of articles, a museum having a large number of exhibits, and a parking garage having a large number of parking spaces.

BRIEF DESCRIPTION OF THE DRAWINGS

FIGS. 6A–C are examples of data structures maintained in and communicated between various components of the present invention.

FIGS. 7A–C are examples of alternative data structures maintained in and communicated between various components of the present invention.

DESCRIPTION OF THE PREFERRED EMBODIMENTS

Figure 1:
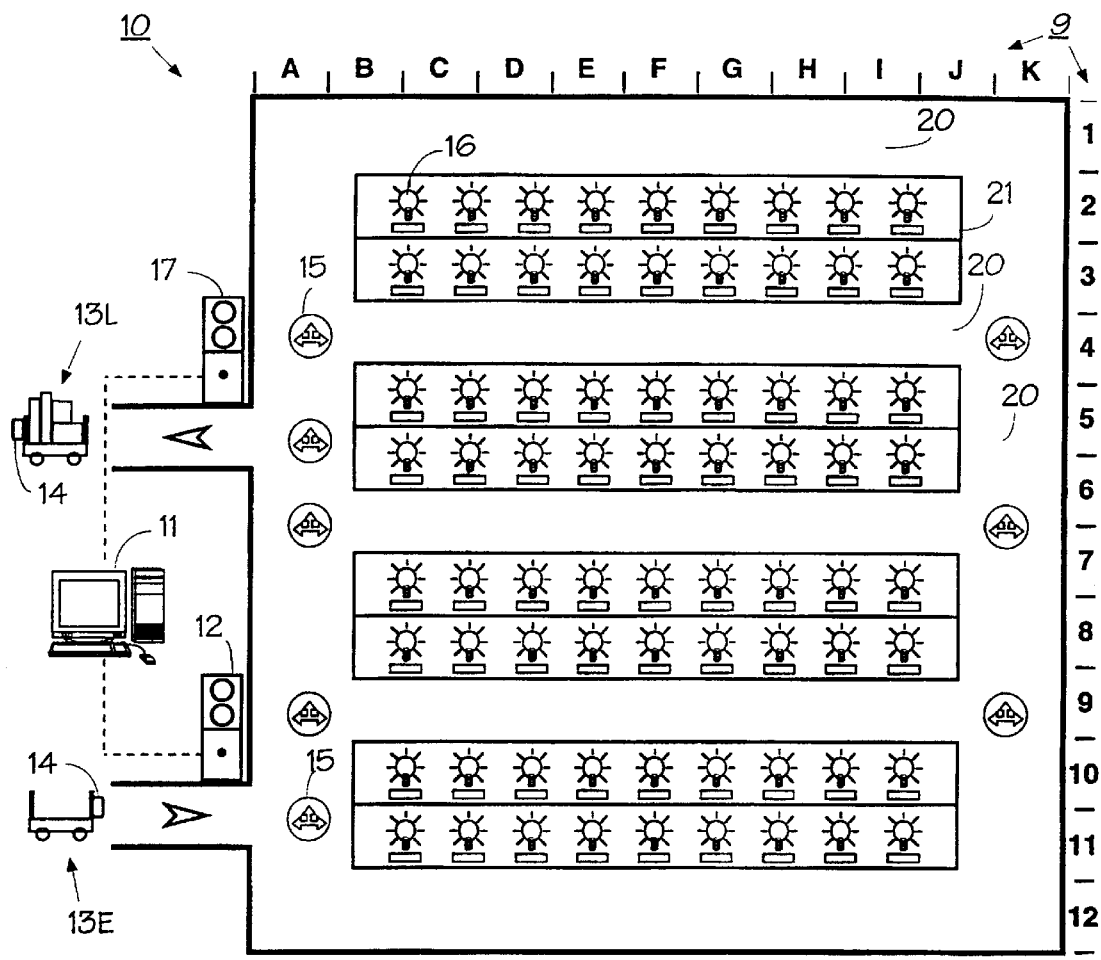
FIG. 1 is a schematic illustration of a layout of a guidance system according to the present invention.

Reference is now made to FIGS. 1 and 2A–C illustrating a layout of a preferred embodiment of the present invention, where the guidance system of the present invention is used to aid operators in executing pick assignments in a warehouse.

Warehouse 10 accommodates grouped merchandise items (not shown) on shelves 21. Passageways 20 allow access to the merchandise items. At each junction formed by the passageways there is provided a changeable traffic sign 15. A changeable target sign 16 is positioned next to each group of identical merchandise items. The entire area is divided into cells by coordinates 9, to allow coarse location identification by coordinates such as B5, H11 etc. It would be appreciated that such coarse identification of locations can alternatively use room numbers, aisle numbers or other symbols; and the term "coordinates" should be interpreted hereinafter in its broader sense, as symbols coarsely identifying localities within the operational area.

An operator, using empty cart 13E and a portable unit 14 attached to the cart, reports at a check-in unit 12. Upon identifying the operator, central computer 11 allocates an assignment for the operator and downloads it to portable unit 14 through check-in unit 12. Upon receiving a "Green" light from traffic light 26 of the check-in unit (FIG. 2C), which confirms the successful download of the assignment information, the operator enters the first junction. By communicating with the changeable traffic sign 15, the portable unit 14 transmits thereto traffic information signals, transformed thereon into visible traffic directions. When arriving to a line of sight with the target destination, as identified by the target sign ID transmitted by the portable unit 14, the respective target sign 16 responds with a visible signal, identifying the adjacent target location. The operator may use an optional operator interface 32 on portable unit 14 (FIG. 3) to enter assignment report information into the portable unit, such as the extent of the assignment completion. After the assignment completion, the operator moves to the next traffic sign 15, where he receives directions which lead him either to the next assignment, or toward the checkout unit 17, where portable unit 14 uploads assignment report information, and then the loaded cart 13L has completed its loading assignment.

Figure 2A:
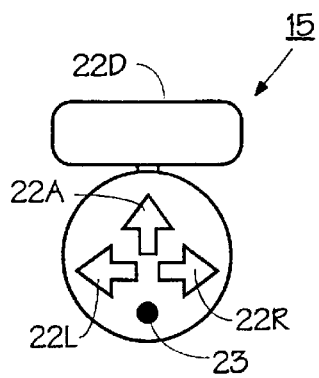
FIGS. 2A–C are schematic illustrations of the signs in the system of FIG. 1.

FIG. 2A illustrates (the appearance of) a changeable traffic sign 15. Infrared receiver (or transceiver, according to the selected embodiment) 23 is operative to communicate with portable unit 14. Light arrows 22A, 22L and 22R are actuated to guide the operator to move ahead, to the left or to the right, respectively. Alphanumeric sign 22D displays information identifying the operator or the assignment.

Figure 2B:
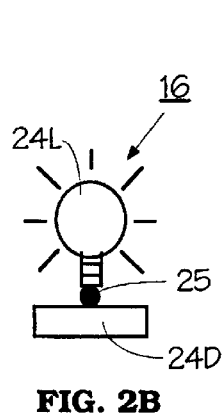

FIG. 2B illustrates a target sign 16. Infrared receiver (or transceiver, according to the selected embodiment) 25 is operative to communicate with portable unit 14. Light 24L signals to identify the selected target, and alphanumeric display 24D operates to display the operators ID and assignment information, e.g. the quantity of items to be picked.

Figure 2C:
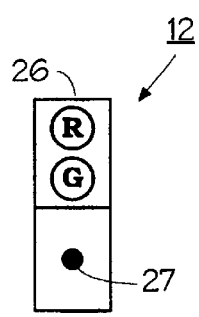

FIG. 2C illustrates a terminal unit functioning as a check-in unit 12 (or as a checkout unit 17). The terminal unit communicates with portable unit 14 through IR transceiver 27. Red-Green lights 26 provide the operator with visible indication whether the upload/download of information from/to the portable unit has been completed.

Figure 3:
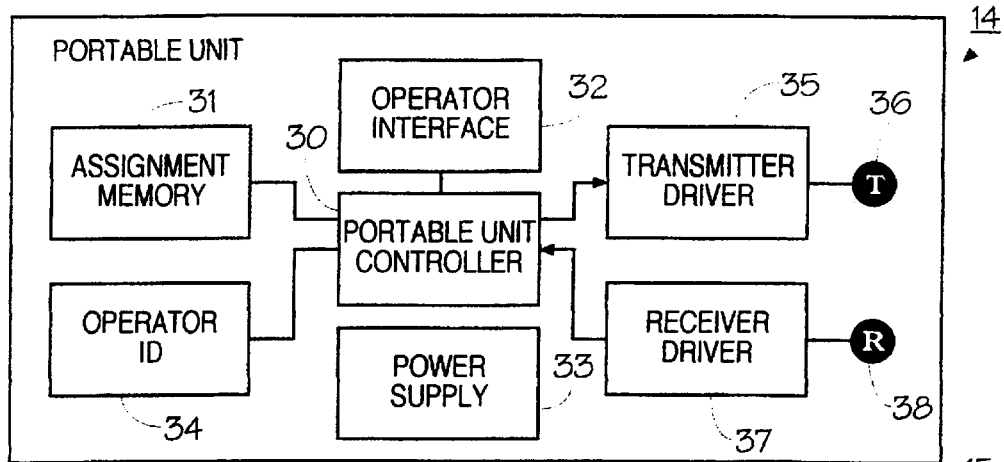
FIG. 3 is a schematic block diagram of a portable unit according to the present invention.

Reference is now made to FIG. 3 which is a block diagram of portable unit 14. Portable unit controller 30 controls the operation of the unit. Operator ID register 34 includes the operators name or code, which is preloaded during the units initialization, and is used to identify the operator when uploading or downloading assignment information, and when communicating with traffic and target signs to identify the operators identity thereon. Operator interface 32, e.g. a keyboard and LCD display, is used to key-in the operator's ID, to be stored in register 34, and assignment report information, to be stored in assignment memory 31. Assignment memory 31 contains assignment information downloaded from computer 11 through check-in unit 12, and report information keyed-in through operator interface 32.

Infrared transmitter 36 and receiver 38, driven through drivers 35 and 37, respectively, are operative to communicate with traffic signs 15, target signs 16, check-in units 12 and check-out units 17. Power supply 33 energizes all other parts of the portable unit 14.

Figure 4:
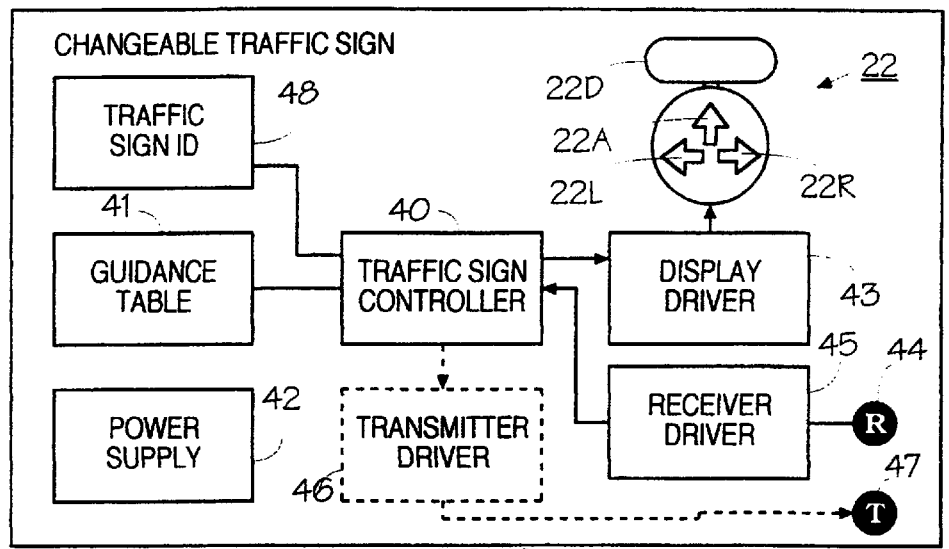
FIG. 4 is a schematic block diagram of a changeable traffic sign according to the present invention.

FIG. 4 is a block diagram of the changeable traffic sign 15 of FIG. 1. controller 40 controls all the operations of the sign. Guidance table 41 includes preloaded information useful for guiding the operator, as will be described in relation to FIGS. 6B and 7B below. Traffic display 22, driven through driver 43, shows visual guidance signals as described in relation to FIG. 2A. The visual guidance signals are displayed for a predetermined delay after the actuating signal, received from portable unit 14, ceases. Receiver 44, driven through driver 45, is operative to receive signals from portable units 14. Transmitter 47 and driver 46 are optional for transmitting signals to portable units 14, if the embodiment of FIGS. 7A–C is selected. Power supply 42 energizes the other parts of the changeable traffic sign.

Figure 5:
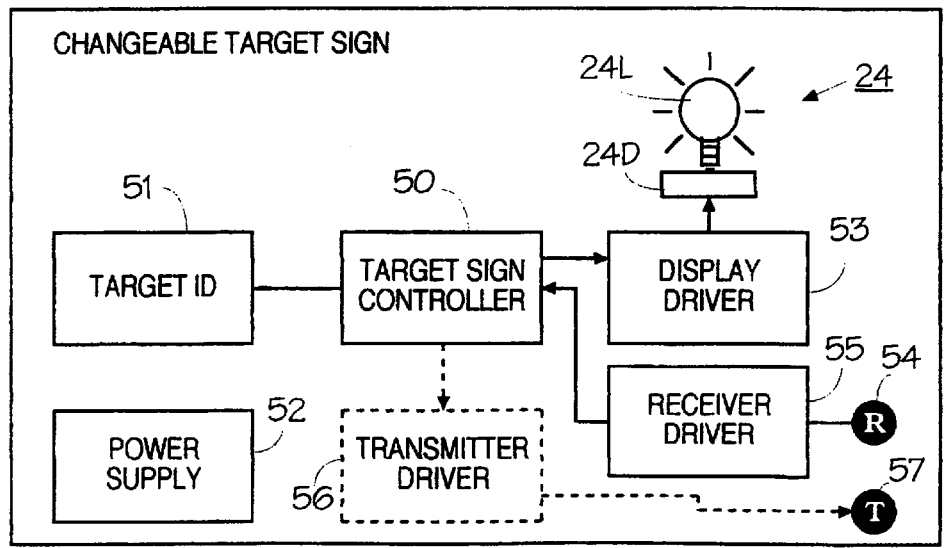
FIG. 5 is a schematic block diagram of a changeable target sign according to the present invention.

FIG. 5 is a block diagram of the changeable target sign 16 of FIG. 1. Controller 50 controls all the operations of the sign. Target ID register 51 includes preloaded target ID information identifying the target, e.g. the code of the adjacent items identified by the sign. Target display 24, driven through driver 53, shows visual signals as described in relation to FIG. 2B. The visual signals are displayed for a predetermined delay after the actuating signal, received from portable unit 14, ceases. Receiver 54, driven through driver 55, is operative to receive signals from portable units 14. Transmitter 57 and driver 56 are optional for transmitting signals to portable units 14, if the embodiment of FIGS.

7A–C is selected. Power supply 52 energizes the other parts of the changeable target sign.

FIGS. 6A–C and 7A–C relate to two preferred embodiments of the data distribution between the portable unit and the changeable signs: The embodiment of FIGS. 6A–C simplifies the portable unit and allows receive-only operation of the changeable traffic signs 15. The embodiment of FIGS. 7A–C simplifies the data stored in the changeable traffic signs, but requires more complicated data in the portable units as well as receive-transmit capability at the changeable traffic signs 15.

FIG. 6A illustrates the data stored in the assignment memory 31 of portable unit 14 in FIG. 3, according to a first preferred embodiment. Each line describes a separate assignment Each assignment is described by its target location coordinates (9 of FIG. 1), the ID of the target, corresponding to the content of the respective target ID register 51 (FIG. 5), and the assignment details. Memory space is reserved for report information for each assignment, to be keyed-in, upon assignment completion, through operator interface 32 (FIG. 3). FIG. 6B describes the contents of the guidance table 41 of FIG. 4 in said first preferred embodiment. Each traffic sign 15 includes a specific, preloaded table which contains directions to each possible coordinate designation. Thus, in the example of FIG. 6B, coordinate A1 (see 9 in FIG. 1) corresponds to the direction "LEFT", i.e. in order to reach the location Al, the operator should turn left at this specific sign. Other coordinates in the table may match directions such as "AHEAD" or "RIGHT" according to their actual physical location. Obviously, different signs will include different tables, according to their physical location. The table for each sign can be prepared manually or by using computer assistance. FIG. 6C relates to the same first preferred embodiment, describing the guidance signal transmitted continuously by portable unit 14 through transmitter 36 (FIG. 3). The guidance signal includes the target location, the target ID and the target details (all from FIG. 6A), and the operator ID (from register 34 of FIG. 3). When this guidance signal is received by a traffic sign (FIG. 2A) the sign displays the traffic direction according to the guidance table of FIG. 68B, and also shows the operator's ID, to avoid ambiguity among neighboring operators. When the signal is received by a target sign (FIG. 2B), the sign examines the signal's "target ID" contents, and if there is a match, the sign provides an eye-catching, visible signal and displays the operator ID and assignment details.

It would be appreciated that addressing (in FIG. 6A) each target by both its coordinates and target ID code is just a matter of practical considerations. In an application such as a warehouse, there are two advantages to this approach: (a) locations in a warehouse accommodating 20,000 items may still be coarsely identified by, say, 100 coordinate symbols (A1–J10), sufficient for navigation among the changeable traffic signs, which will reduce the size of and simplify the guidance table included in each traffic sign; (b) items in the warehouse may be moved from time to time to different locations; the target sign will then be moved with the corresponding items, the central computer will be updated to associate the moved items with their new location coordinates, but no change will be required in the memories of the traffic and target signs. In other applications, however, where targets are fixed in their location, FIG. 6A may be modified by eliminating the "Target Location" column, in FIG. 6B the "Location" column will be replaced by "Target ID" column for specifying the directions from each sign to each target ID, and in FIG. 6C the "Target Location" data will be eliminated from the guidance signal.

FIG. 7A illustrates the data stored in the assignment memory 31 of portable unit 14 in FIG. 3, according to a second preferred embodiment. Each line describes a separate assignment. Each assignment is described by its entire route to the target location, the ID of the target, and the assignment details. The route is defined by a series of consecutive traffic signs and the directions preassigned for each such sign; for example, assignment number I in FIG. 7A reads: "at sign #1 turn left; then, at sign #3 turn right; at sign #6 go straight ahead and at sign #8 turn right; then you are expected to hit item #1234 where you pick four boxes". Memory space is reserved for report information for each assignment, to be keyed-in, upon assignment completion, through operator interface 32 (FIG. 3). FIG. 7B describes the contents of the guidance table 41 of FIG. 4 in said second preferred embodiment, which is simply the sign identification number used in the route directions of FIG. 7A. FIG. 7C relates to the same second preferred embodiment, describing the guidance signal transmitted continuously by portable unit 14 through transmitter 36 (FIG. 3). The guidance signal includes the operator ID, and then the next segment of the assignment, which is a pair of either a sign # +direction (UR/A), or the target ID +assignment detail, all taken from the assignment memory of FIG. 7A. In this case, the portable unit 14 communicates with changeable signs (traffic 15 and target 16), to actuate a visual response corresponding to the signal, and then receives an acknowledge signal from the sign, which causes the message transmitted by the portable unit to change to the consecutive message from the assignment memory (FIG. 7A).

The calculation of the contents of the assignment memory, according to either FIG. 6A or 7A, is preferably made by central computer 11 of FIG. 1 and is downloaded to the portable unit 14 through check-in unit 12. The calculation uses mapping information entered manually to associate target IDs with physical locations, and in FIG. 7A also route selection algorithms, such as those used in many navigation applications, to determine a preferred route for reaching the target. Alternatively, a manual planning of each assignment can be made by a human attendant, and keyed-in into central computer 11.

The reliability of the embodiment described in FIGS. 7A–C is strongly dependent upon a flawless operation of the operator and all signs; a malfunction in a single sign, or a single unawareness to a traffic signal, may break the logical continuity of the route directions, thus leading to unresolvable situations. For this reason, the embodiment of FIGS. 6A–C is preferable and, unless otherwise specified, will be used hereinafter.

Figure 8:
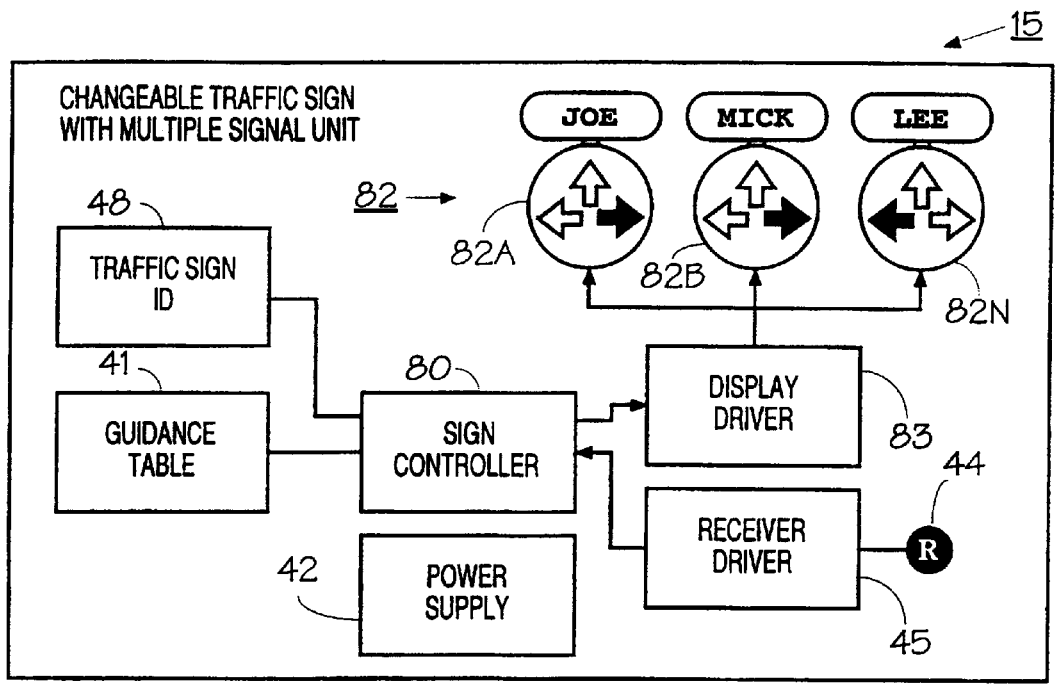
FIG. 8 is a schematic block diagram of a changeable traffic sign with a multiple signal unit.

FIG. 8 describes a preferred embodiment for a changeable traffic sign, for environments where many operators operate simultaneously. In such a case, using the traffic sign of FIGS. 2A and 4 may be insufficient, as several operators may approach the same traffic sign simultaneously. This embodiment, adapted as an example to the case of FIGS. 6A–C (no transmission capability is needed in the sign) receives guidance signals from portable units 14 through receiver 44. In this case, the transmission of guidance signals (FIG. 6C) should preferably occur with random intervals, so that if signals from two portable units 14 happen to coincide, then the next signals will probably be received without interference. When a proper signal is received by changeable traffic sign 15 of FIG. 8, sign controller 80 assigns it to one of the plurality of displays 82A . . . 82N; if another signal is received before the first one expires, it is displayed on the next available display of 82A . . . 82N, and so on.

Figure 9:
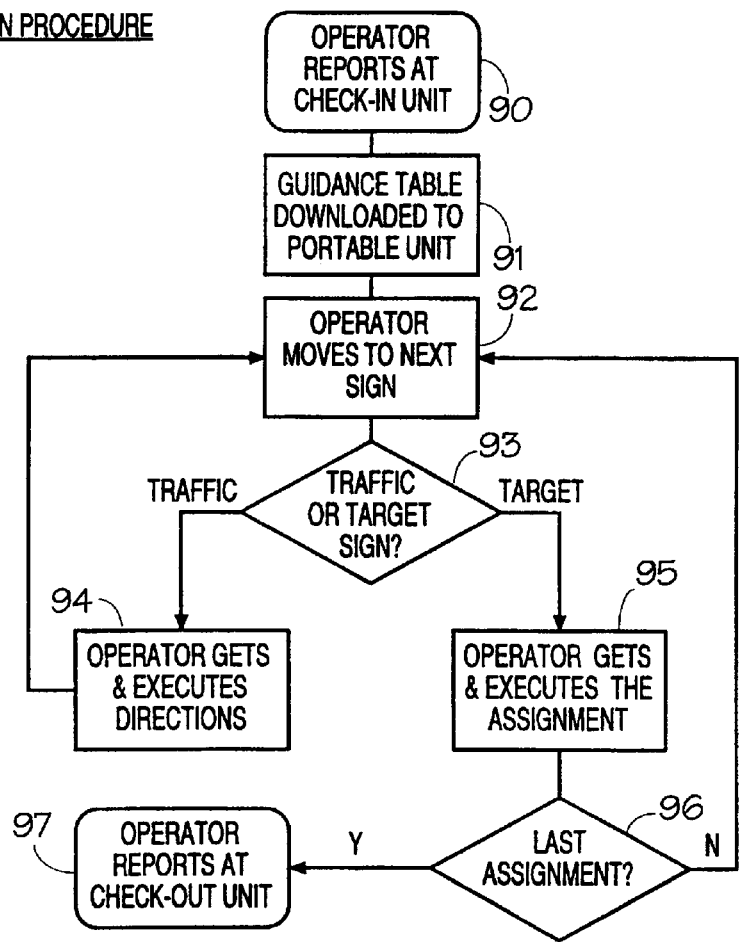
FIG. 9 is a flowchart describing the operation of the present invention.

FIG. 9 is a flowchart, summarizing the operation of a preferred embodiment of the system according to the present invention; reference is also made to FIG. 1. In block 90 the operator reports at check-in unit 12, where, in block 91, his assignment list is downloaded to his portable unit 14 in the form of a guidance table (e.g. FIG. 6A). A green light 26 on check-in unit 12 indicates that the download process has been completed, and the operator moves into the warehouse area, facing the first changeable sign (block 92), which is a traffic sign (blocks 93, 94). Traffic sign 15 receives a guidance signal (e.g. FIG. 6C) and responds with displaying traffic directions, by matching the direction instruction (from FIG. 6C) with the target location coordinates, according to the guidance table of FIG. 6B. The operator ID included in the guidance signal, is preferably also displayed by traffic sign 15, to assure the operator that the displayed message relates to him. The displayed traffic direction, e.g. in a form of an illuminated arrow, leads the operator to the next changeable sign (block 92), which is either a traffic sign or a target sign (block 93). If it is a traffic sign, the procedure described above repeats; if it is a target sign, at block 95 the sign with the matching target ID responds to the guidance signal (FIG. 6C) by blinking with an eyecatching fight and displaying the assignment details, along with the operator ID, taken from the guidance signal of FIG. 6C. The operator then executes the assignment (still in block 95), and, if appropriate, keys-in report information into portable unit 14. If the assignment has been the last assignment, as indicated in the contents of the assignment (e.g. "pick 8 boxes and report at checkout #6"), the operator moves then to a checkout unit 17, where the report information is uploaded from portable unit 14 to central computer 11 via checkout unit 17. If the assignment has not been the last one in the assignment memory (FIG. 6A), the operator approaches the next traffic sign and the procedure described above is executed once again.

Another preferred embodiment will be described herein relating to a guidance system for museum visitors interested in visiting selected exhibits. This embodiment is described below in reference to FIGS. 2A, 2B, 3, 4, 5, 6A–C 10 and 11.

Figure 10:
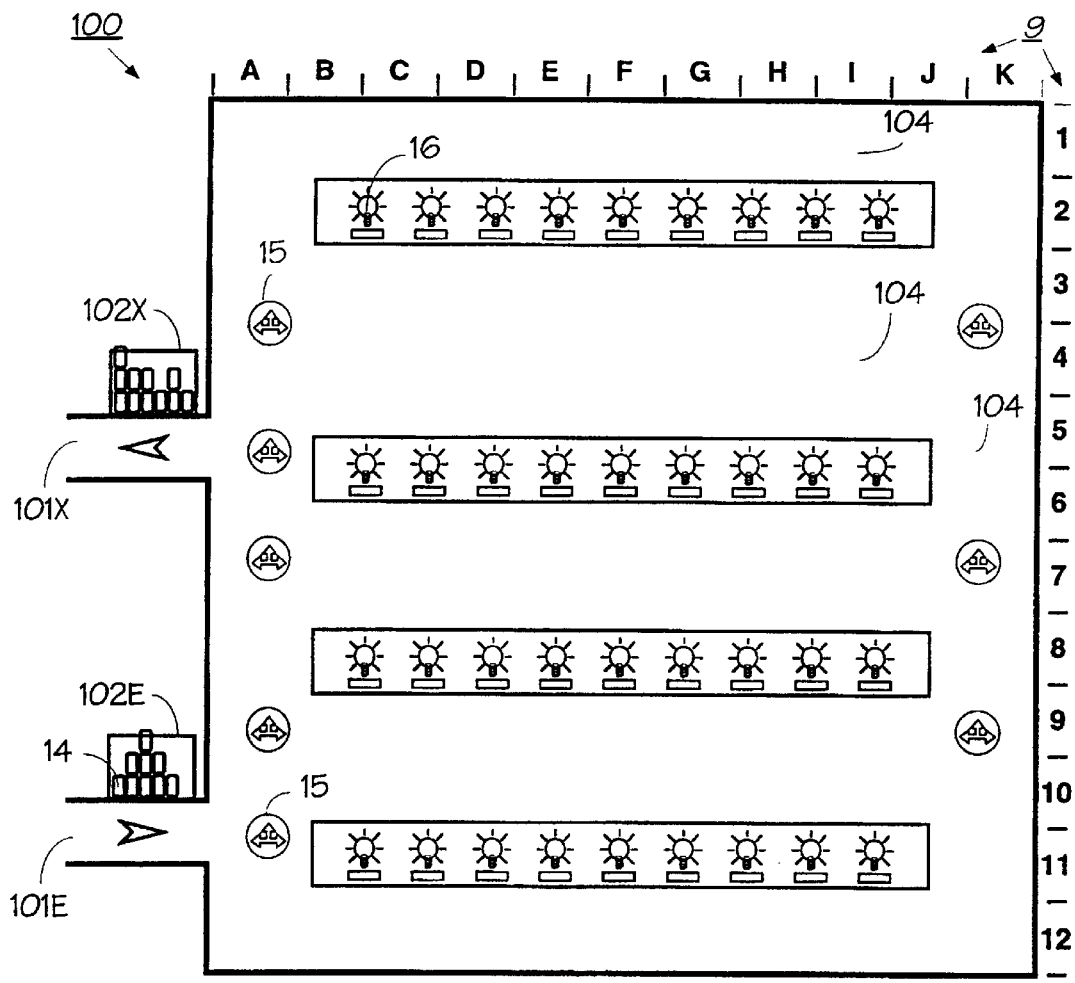
FIG. 10 is a schematic illustration of a layout of another variation of the guidance system according to the present invention.

FIG. 10 describes a museum 100 with halls and passageways 104 enabling visitors to access and observe exhibits. A target sign 16 is placed next to each exhibit. Traffic signs 15 are placed at each junction. At each entrance door 101E there is a basket 102E containing portable units 14, which are hand held units (FIG. 3, with receiver 38 and receiver driver 37 eliminated). At each exit door 101X, there is a basket 102X where the visitors return the portable units 14 upon leaving the museum.

Figure 11:
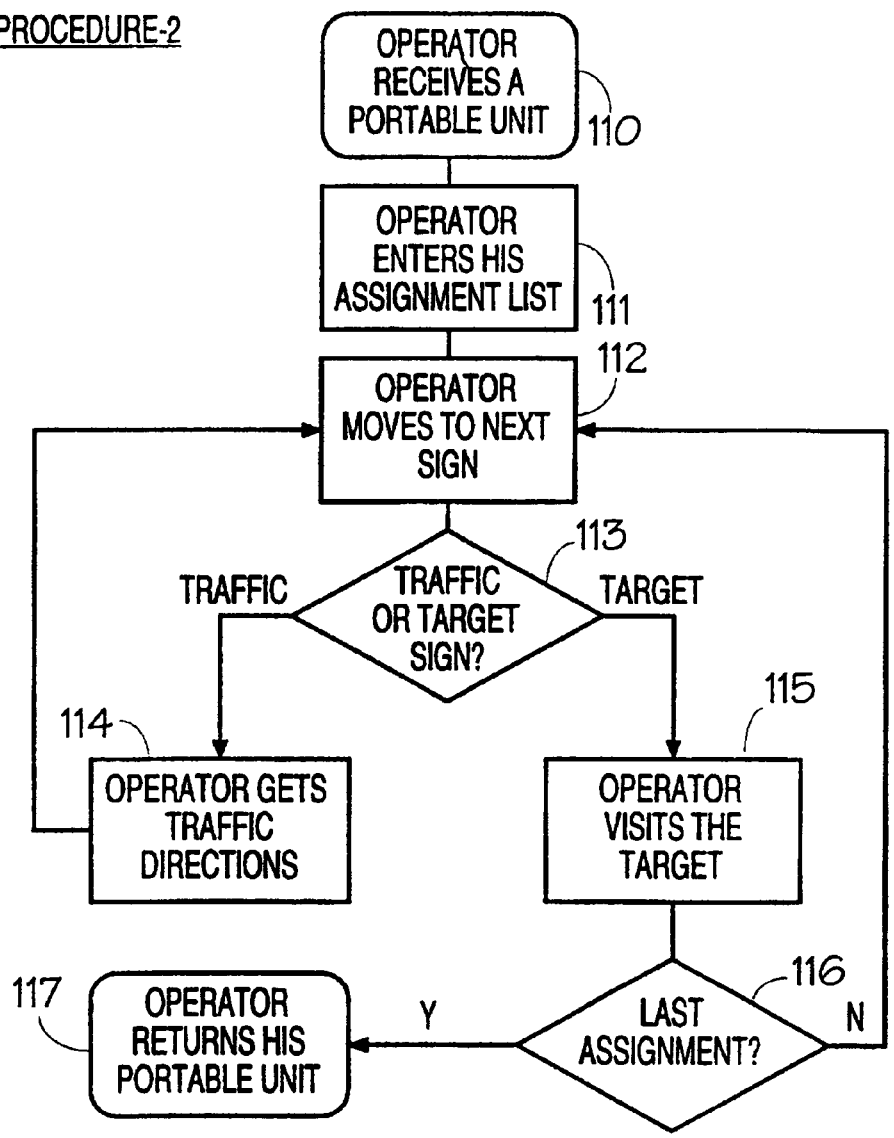
FIG. 11 is a flowchart describing the operation of the variation of FIG. 10.

Reference is now made to FIG. 11, describing the operation of the system of FIG. 10. In block 110 the visitor receives his portable unit 14 at entrance door 101E. In block 111 the visitor uses operator interface 32 (FIG. 3) to key-in his ID (e.g. name), and a selected list of exhibits, each identified by its location coordinates and exhibit code, as taken from the exhibition catalog or map. This information establishes the contents of registers 31 and 34 of FIG. 3, according to a simplified version of the table of FIG. 6A, where the "assignment details" and "report" columns are eliminated. Then the visitor moves into the museum area, facing the first changeable sign (block 112), which is a traffic sign (blocks 113, 114). Traffic sign 15 receives a guidance signal (FIG. 6C, with the "Assignment Details" eliminated) and responds with displaying traffic directions, by matching the direction instruction (from FIG. 6C) with the target location coordinates, according to the guidance table of FIG. 6B. The visitor ID included in the guidance signal, is preferably also displayed by traffic sign 15, to assure the visitor that the displayed message relates to him. The displayed traffic direction, e.g. in a form of an illuminated arrow, leads the visitor to the next changeable sign (block 112), which is either a traffic sign or a target sign (block 113). If it is a traffic sign, the procedure described above repeats, if it is a target sign, at block 115 the sign with the matching target ID responds to the guidance signal (FIG. 6C) by blinking with an eye-catching light, along with the visitor ID taken from the guidance signal of FIG. 6C. The visitor then observes the exhibit (still in block 95). If the exhibit has been the last one on the list, as indicated on the display, the visitor moves to an exit door 101X, where he returns his portable unit 14 into basket 102X. If the exhibit has not been the last one in the assignment memory (FIG. 6A), the visitor approaches the next traffic sign and the procedure described above is executed once again.

Another variation of a warehouse guidance system will be described in reference to FIGS. 12–15, In this variation, there are no specific entrance or exit gates; instead, guidance and/or reporting information is communicated to and from the portable units throughout the warehouse area via a wireless communication link. This allows frequent, flexible changes of the assignments even during their execution.

Figure 12:
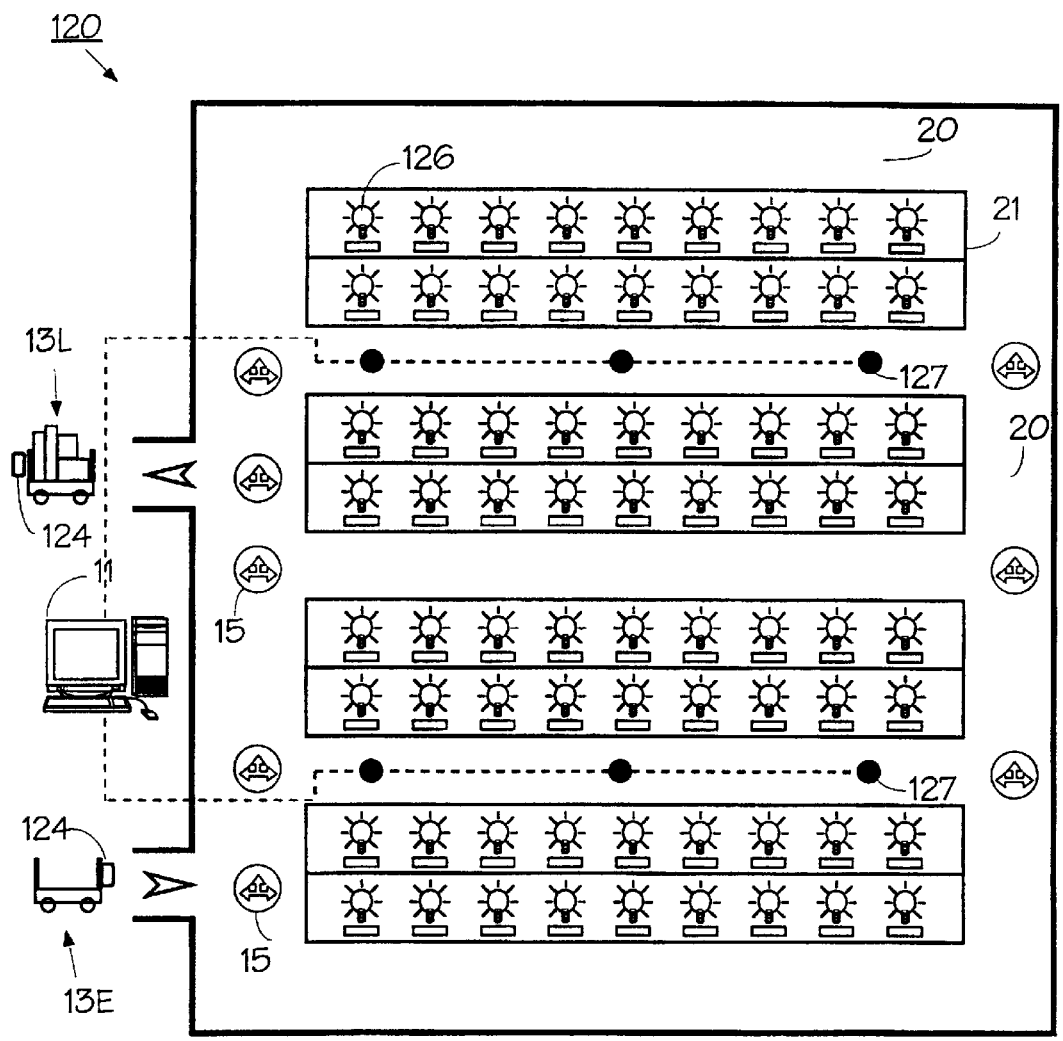
FIG. 12 is a schematic illustration of an alternative layout of a variation of the guidance system according to the present invention.
Figures 13, 14A, 14B, 14C, 14D:
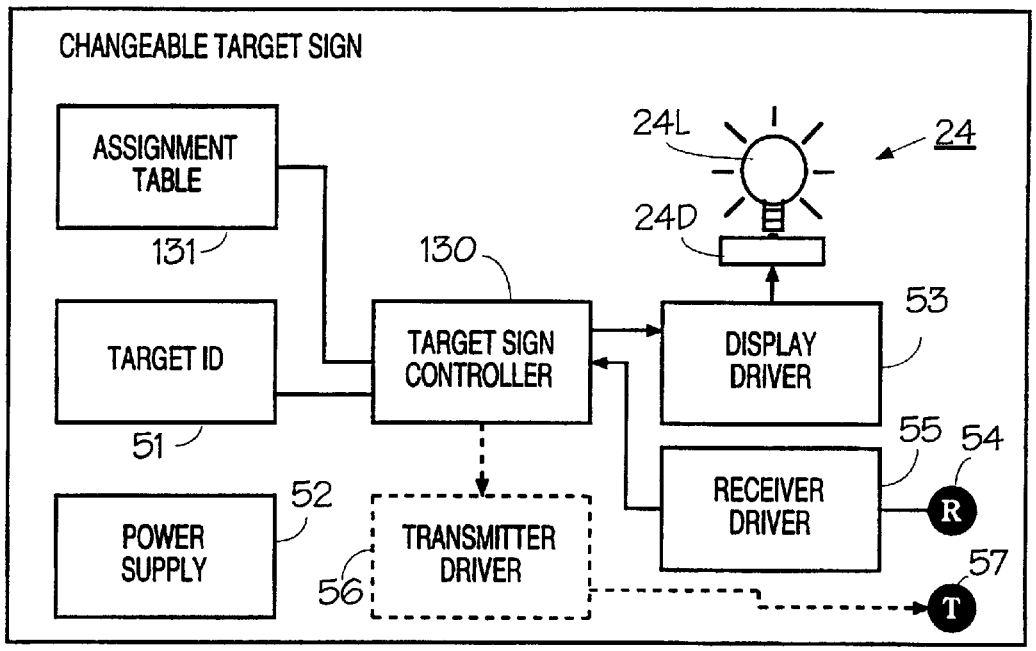
FIG. 13 is a block diagram of a changeable target sign adapted to the variation of FIG. 12.
FIGS. 14A–D illustrate the data in the assignment memory, guidance table, guidance signal and assignment table, according to the variation of FIG. 12.

FIG. 12 illustrates warehouse 120, where central computer 11 is linked to a plurality of infrared transceivers 127 deployed throughout the warehouse ceiling to communicate with all changeable target signs 126, changeable traffic signs 15 and portable units 124. Such infrared communication rinks are known in the art and operate commercially. Transmission is usually made by broadcasting coded signals, including address information identifying specific units. Each unit which includes an infrared receiver examines the received signal, and takes into account only messages addressed to it, according to the contents of address register 34 (FIG. 3), 48 (FIGS. 4 and 8) or 51 (FIGS. 5 and 13). Uploading information is made by portable units 14 (FIG. 3) by employing transmitter 36 to communicate with any of the ceiling transceivers 127 (FIG. 12).

FIG. 13 describes a preferred embodiment of the changeable target sign according to the variation of FIG. 12. It is similar to the changeable target sign 16 of FIG. 51 except that storage device 131, including assignment table information (see FIG. 14D), is added.

FIG. 14A describes the contents of the assignment memory register 31 of portable unit 14 (FIG. 3) according to the variation of FIG. 12. The contents is a list of assignments, each identified by a target ID. This list can be downloaded or modified by central computer 11, by communication between the central computer and a selected portable unit through ceiling transceivers 127. The list contains just the target ID, and memory space is reserved for keying-in report information via operator interface 32 (FIG. 3). FIG. 14B describes the contents of guidance table 41 (FIGS. 4 and 8), assigning a direction ("left", "right", "ahead") from each traffic sign 15 to each active target. This information, relating only to active targets (i.e. targets which are associated with current assignments), is computed by central computer 11 and is downloaded selectively to relevant traffic signs 15, according to a reasonable path of the operator; in one case all traffic signs can receive guidance signals to all active targets; in another case, to save communication time between the central computer and the traffic signs, signs which are remote from the path of the operator may be not communicated. FIG. 14C describes the contents of the guidance signal transmitted continuously by portable unit 14 via transmitter 36. It includes the target ID, to be identified and responded to by traffic signs and the corresponding target sign, and the operator ID to be displayed on the responding signs, to avoid ambiguity with directions aimed at neighboring operators. FIG. 14D describes the contents of assignment table 131 (FIG. 13), which has been added to this variation. This information is downloaded to the target sign by central computer 11 via ceiling transceivers 127 (FIG. 12). When an operator identifies himself by transmitting the guidance signal (FIG. 14C), the assignment details corresponding to this operator, along with a guidance signal and the operator's ID, are displayed on the changeable target sign 126.

Figure 15:
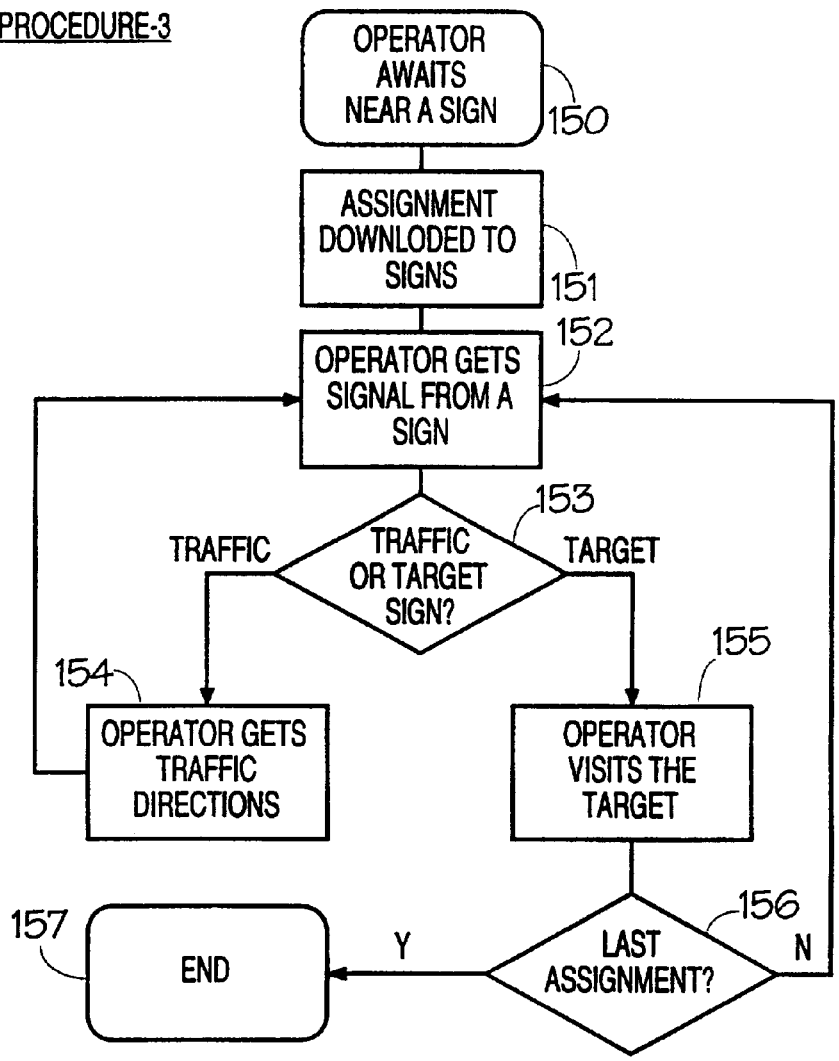
FIG. 15 is a flowchart describing the operation of the variation of FIG. 12.

FIG. 15 summarizes the operation procedure of the variation of FIG. 12. In block 150 the operator awaits near a sign. As no assignment has been downloaded yet to his portable unit, his portable unit transmits no signal and hence no response is received. In block 151 central computer has selected and computed an assignment for the operator, and accordingly transmits the contents of the assignment memory 31 to the operators portable unit 14 (FIGS. 3 and 14A), the contents of guidance table 41 (FIGS. 41 and 14B) to all relevant traffic signs 15, and the contents of assignment table 131 (FIGS. 13 and 14D) to the selected target sign 126. As a result, portable unit 14 starts transmitting the guidance signal (FIG. 14C). In block 152 the relevant adjacent sign responds to the guidance signal. If it is a traffic sign (block 154) the operator receives traffic directions and travels accordingly to the next sign (block 153). If it is a target sign (block 155) the operator visits the target, executes his assignment according to the details displayed on the target sign, reports as appropriate, and then, according to the details of the assignment, he executes the next assignment (block 152), or completes his task (block 157).

Another application of interest is a parking garage, where an empty space is allocated to each car entering an entrance gate. A portable unit, preloaded with the allocated parking spot details, is handed or automatically dispensed to the driver at an entrance gate. The portable unit interacts with changeable traffic signs to produce driving directions, and then the specific, preassigned parking spot is clearly identified by its changeable target sign. In this case, the communication between the portable unit and the preassigned target sign confirms that the driver has reached his parking space, which is preferably recorded in the assignment memory (FIG. 6A or 7A) as report information, and reported at an exit gate (where the portable unit is also returned) for control purpose.

Another variation of interest relates to a warehouse divided into zones, each zone served by an operator. The portable unit is attached to a cart or a box which accommodates the picked items, thus a pick assignment may be executed by several operators, each moving and loading the cart or box in his turn. As the cart or box is moved and loaded by a zone's operator, the attached portable unit communicates with and triggers the changeable signs in its vicinity in accord to the respective assignment. At the border between two zones, the cart or box, along with the attached portable unit, is left to be moved and loaded by the adjacent zone's operator, and so on, until the assignment is completed.

In still another variation of interest, portable unit 14 (FIG. 3) also includes a display screen controlled by portable units controller 30. When communicating with changeable traffic sign 15 or changeable target sign 16, at least part of the information to be displayed on these changeable signs may be displayed on the portable unit's display, instead of or in addition to being displayed on the sign. This may aid the operator in reading and distinguishing the information relating to him, and even allow eliminating the display 22 on changeable traffic sign 4 (which actually converts it to a guidance transponder instead of a sign,) or eliminating the screen 24D of the changeable target sign 16, while leaving the light 24L on the sign for better identification of the target.

While the preferred embodiments described above relate principally to warehouse and museum applications, it would be appreciated that the guidance system of the present invention is useful in many other applications.

What is claimed is:

1. A guidance system for guiding a user to selected targets among a plurality of targets located within a defined area, comprising:

a portable unit to be carried by the user, including a memory for storing target information identifying a selected target within said defined area, and a transmitter for transmitting signals identifying the selected target within said defined area;

and at least one changeable guidance sign at a predetermined location within said defined area, said changeable guidance sign including a receiver for receiving signals transmitted by said portable unit, a memory for storing guidance information relating the locations of said plurality of targets with respect to said predetermined location of the changeable guidance sign, and a display for displaying the stored guidance information of the location of a target corresponding to a signal transmitted from said portable unit and received by the changeable guidance sign.

2. The system according to claim 1, wherein there are a plurality of said changeable guidance signs each at one of a plurality of predetermined locations within said defined area.

3. The system according to claim 1, wherein said portable unit memory stores information identifying a plurality of targets to be visited in sequence, and said transmitter transmits signals identifying the respective selected target to be visited in the sequence.

4. The system according to claim 1, wherein said system further comprises a plurality of target devices, one at each of said target locations, each of said target devices including a receiver for receiving target signals transmitted by said portable unit, and a target indicator for indicating that a received target signal identifies the respective target.

5. The system according to claim 4, wherein each of said portable units also transmits its identification to each of the target devices, and each of said target devices also displays the identification of the respective portable unit transmitting a signal received by the target device.

6. The system according to claim 4, wherein each of said target devices is a changeable sign displaying information which changes in response to the target signal received thereby.

7. The system according to claim 1, wherein there are a plurality of said portable units, each to be carried by one of a plurality of users of the guidance is system, and wherein each of said portable units transmits its identification to the changeable guidance sign, and said changeable guidance sign also displays the identification of the respective portable unit transmitting a signal received by the changeable guidance sign.

8. The system according to claim 7, wherein said changeable guidance sign display includes a plurality of display devices for simultaneously displaying guidance information of the locations of a plurality of targets for a plurality of portable units, and the identification of the respective portable unit.

9. The system according to claim 7, wherein the system further comprises a computer for storing said target data identifying the targets within said defined area, and for communicating with said portable units to download into their respective memories the target information identifying selected targets within said defined area.

10. The system according to claim 9, wherein the system further comprises a check-in unit linked to said computer for communicating with said portable units to download into their respective memories the target information identifying the selected targets within said defined area.

11. The system according to claim 9, wherein said system further comprises wireless communication links enabling said computer to communicate with said portable units to download into their respective memories is-the target information identifying the selected targets within said defined area.

12. The system according to claim 1, wherein said defined area is a warehouse for storing a large number of articles at a plurality of locations, each location representing a target location to which the user carrying a portable unit is to be guided.

13. The system according to claim 1, wherein said defined area is a museum having a large number of exhibits at a plurality of locations, each location representing a target location to which the user carrying a portable unit is to be guided.

14. The system according to 1, wherein said defined area is a parking garage having a large number of parking spaces at a plurality of locations, each location representing a target location to which a user carrying a portable unit is to be guided.

15. A guidance system for guiding a user to a selected target among a plurality of targets located within a defined area, comprising:

a portable unit to be carried by the user, including a memory for storing target information identifying the selected target, and a transmitter for transmitting a target signal representative of the target information;

a target device adjacent to said selected target, including a receiver for receiving signals transmitting by said portable unit, and a target indicator or indicating that a received signal is said target signal representative of said target information identifying said selected target;

a computer for storing said target information;

and a check-in unit linked to said computer for communicating with said portable unit to download into its memory said target information identifying said selected target;

and a check-in unit linked to said computer for communicating with said portable units to download into its memory said target information identifying said selected target.

16. The system according to claim 15, wherein said check-in unit downloads into the memory of said portable unit target information of a plurality of selected targets within said defined area to which the user carrying the portable unit is to be sequentially guided, and wherein said portable unit include a manual input device to sequentially selected each of said plurality of selected targets.

17. The system of claim 15, wherein said computer also stores assignment information specifying a task to be performed by the user at said selected target, the assignment information is also downloaded into the memory of said portable unit with the respective target information.

18. The system according to claim 17, wherein said assignment information is also displayed on said portable unit.

19. The system according to claim 17, wherein said assignment information is also transmitted by said portable unit and is received and displayed by the respective target devices.

20. The system according to claim 17, wherein each of said portable units includes a manual input device for manually inputting report information relating to the task specified to be performed by said assignment information.

\* \* \* \* \*